US012569947B2

(12) United States Patent
    Graham

(10) Patent No.: US 12,569,947 B2
(45) Date of Patent: Mar. 10, 2026

(54) METHOD AND APPARATUS FOR SERVICING ENGINES

(71) Applicant: General Electric Company, Evendale, OH (US)

(72) Inventor: Andrew Crispin Graham, Badminton (GB)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/975,319

(22) Filed: Dec. 10, 2024

(65) Prior Publication Data

US 2025/0242450 A1      Jul. 31, 2025

Related U.S. Application Data

(62) Division of application No. 18/423,660, filed on Jan. 26, 2024, now Pat. No. 12,186,848.

(51) Int. Cl.
    *B25J 13/08* (2006.01)
    *B23P 6/00* (2006.01)
    *B25J 9/06* (2006.01)
    *F01D 21/00* (2006.01)
    *G01M 15/02* (2006.01)

(52) U.S. Cl.
    CPC .................. *B23P 6/00* (2013.01); *B25J 13/08* (2013.01); *F01D 21/003* (2013.01); *B25J 9/065* (2013.01); *F05D 2230/72* (2013.01); *F05D 2260/83* (2013.01); *G01M 15/02* (2013.01)

(58) Field of Classification Search
    CPC ............. F05D 2230/72; F05D 2230/80; F05D 2260/83; F01D 21/003; B25J 13/08; B25J 9/065
    See application file for complete search history.

(56) References Cited

U.S. PATENT DOCUMENTS

| | | | |
|---|---|---|---|
| 3,095,050 A | 6/1963 | Du Berger | |
| 3,190,286 A | 6/1965 | Stokes | |
| 3,690,775 A | 9/1972 | Cousins | |
| (Continued) | | | |

FOREIGN PATENT DOCUMENTS

| | | |
|---|---|---|
| CN | 217182515 | 8/2022 |
| CN | 218018164 | 12/2022 |
| (Continued) | | |

OTHER PUBLICATIONS

U.S. Appl. No. 18/975,319; Requirement for Restriction/Election mailed Apr. 28, 2025; (pp. 8).

(Continued)

*Primary Examiner* — Christopher J. Besler

(74) *Attorney, Agent, or Firm* — Fitch, Even, Tabin & Flannery LLP

(57) ABSTRACT

A snake-arm robot and a servicing device are mechanically coupled. The mechanical coupling is accomplished by a longitudinal insertion of the snake-arm robot into the servicing device or the servicing device into the snake-arm robot. An actuator moves the snake-arm robot through a passage within an engine until the snake-arm robot reaches a desired location. The movement of the snake-arm robot concurrently moves the servicing device through the passage. Subsequently, the snake-arm robot is de-coupled from the servicing device and the snake-arm robot is removed from the engine while leaving the servicing device in place within the engine.

16 Claims, 11 Drawing Sheets

(56) References Cited

U.S. PATENT DOCUMENTS

| | | | |
|---|---|---|---|
| 3,778,170 | A | 12/1973 | Howell |
| 4,298,312 | A | 11/1981 | Mackenzie |
| 4,522,555 | A | 6/1985 | Inoue |
| 4,991,957 | A | 2/1991 | Sakamoto |
| 5,052,803 | A | 10/1991 | Krauter |
| 5,066,122 | A | 11/1991 | Krauter |
| 5,381,226 | A | 1/1995 | Brunell |
| 5,531,664 | A | 7/1996 | Adachi |
| 7,033,979 | B2 | 4/2006 | Herwig |
| 7,171,279 | B2 | 1/2007 | Buckingham |
| 7,721,435 | B2 | 5/2010 | Stokes |
| 8,028,936 | B2 | 10/2011 | Mcdermott |
| 8,219,246 | B2 | 7/2012 | Buckingham |
| 8,277,647 | B2 | 10/2012 | Rice |
| 8,400,501 | B2 | 3/2013 | Heyworth |
| 8,602,722 | B2 | 12/2013 | George |
| 8,758,232 | B2 | 6/2014 | Graham |
| 8,768,509 | B2 | 7/2014 | Unsworth |
| 9,016,159 | B2 | 4/2015 | Kell |
| 9,138,782 | B2 | 9/2015 | Dorshimer |
| 9,347,855 | B2 | 5/2016 | Kell |
| 9,403,244 | B2 | 8/2016 | Rautenberg |
| 9,739,168 | B2 | 8/2017 | Ekanayake |
| 9,926,517 | B2 | 3/2018 | Tibbetts |
| 9,932,854 | B1 | 4/2018 | Tibbetts |
| 9,951,647 | B2 | 4/2018 | Rawson |
| 9,957,066 | B2 | 5/2018 | Bewlay |
| 10,005,111 | B2 | 6/2018 | Eriksen |
| 10,018,113 | B2 | 7/2018 | Bewlay |
| 10,227,891 | B2 | 3/2019 | Eriksen |
| 10,323,539 | B2 | 6/2019 | Bewlay |
| 10,335,943 | B2 | 7/2019 | Yoon |
| 10,377,968 | B2 | 8/2019 | Brooks |
| 10,385,723 | B2 | 8/2019 | Flynn |
| 10,634,004 | B2 | 4/2020 | Giljohann |
| 10,669,885 | B2 | 6/2020 | Pecchiol |
| 10,920,181 | B2 | 2/2021 | Martin |
| 11,027,317 | B2 | 6/2021 | Tibbetts |
| 11,103,964 | B2 | 8/2021 | Lipkin |
| 11,260,477 | B2 | 3/2022 | Huttner |
| 11,441,446 | B2 | 9/2022 | Rawson |
| 11,458,641 | B2 | 10/2022 | Graham |
| 11,654,547 | B2 | 5/2023 | Graham |
| 11,662,319 | B2 | 5/2023 | Peters |
| 11,707,819 | B2 | 7/2023 | Graham |
| 11,752,622 | B2 | 9/2023 | Graham |
| 12,186,848 | B1 | 1/2025 | Graham |
| 12,195,202 | B1 | 1/2025 | Andalam |
| 2015/0159122 | A1 | 6/2015 | Tibbetts |
| 2017/0165721 | A1 | 6/2017 | Tibbetts |
| 2017/0167290 | A1 | 6/2017 | Kulkarni |
| 2017/0191376 | A1 | 7/2017 | Eriksen |
| 2017/0204739 | A1 | 7/2017 | Rawson |
| 2017/0254217 | A1 | 9/2017 | Eriksen |
| 2018/0149038 | A1 | 5/2018 | Eriksen |
| 2018/0155060 | A1 | 6/2018 | Dauenhauer |
| 2018/0216036 | A1 | 8/2018 | Tibbetts |
| 2018/0237163 | A1 | 8/2018 | Bewlay |
| 2018/0245477 | A1 | 8/2018 | Kulkarni |
| 2018/0258787 | A1 | 9/2018 | Tibbetts |
| 2018/0291803 | A1 | 10/2018 | Belay |
| 2018/0298781 | A1 | 10/2018 | Tibbetts |
| 2018/0313225 | A1 | 11/2018 | Millhaem |
| 2018/0355751 | A1 | 12/2018 | Tibbetts |
| 2019/0063223 | A1 | 2/2019 | Lipkin |
| 2019/0153890 | A1 | 5/2019 | Eriksen |
| 2019/0323378 | A1 | 10/2019 | Tibbetts |
| 2020/0180084 | A1 | 6/2020 | Lipkin |
| 2020/0346310 | A1 | 11/2020 | Huttner |
| 2021/0102870 | A1 | 4/2021 | Trivedi |
| 2021/0108537 | A1 | 4/2021 | Rigg |
| 2021/0317752 | A1 | 10/2021 | Deja |
| 2022/0268170 | A1 | 8/2022 | Andalam |
| 2022/0281102 | A1 | 9/2022 | Chungbin |
| 2023/0091418 | A1 | 3/2023 | Patel |
| 2023/0194234 | A1 | 6/2023 | Graham |
| 2023/0264816 | A1 | 8/2023 | Chung |
| 2025/0242948 | A1 | 7/2025 | Andalam |

FOREIGN PATENT DOCUMENTS

| | | |
|---|---|---|
| CN | 117404145 | 1/2024 |
| DE | 202004004842 | 2/2006 |
| DE | 112010004203 | 12/2013 |
| DE | 102013202616 A1 | 8/2014 |
| DE | 102015006330 | 11/2016 |
| EP | 2733313 | 5/2014 |
| EP | 3075998 A1 | 10/2016 |
| EP | 3165893 | 5/2017 |
| EP | 3510251 | 8/2021 |
| FR | 3095050 | 10/2020 |
| JP | 2010158396 A | 7/2010 |
| JP | 5276998 | 8/2013 |
| WO | 2016076704 | 5/2016 |
| WO | 2020022474 A1 | 1/2020 |
| WO | 2020030516 A1 | 2/2020 |

OTHER PUBLICATIONS

U.S. Appl. No. 18/978,930, filed Dec. 12, 2024, entitled "System and Method for Servicing Aircraft Engines".

Disclosing You Tube Video entitled "OC Robotics—Snake Arm 101"; https://www.youtube.com/watch?v=Ij8VX9YUT_Y; published Sep. 22, 2016; Disclosing screen captures (5 pgs.).

Levine, David J., et al., "Materials with electroprogrammable Stiffness", https://doi.org/10.1002/adma.202007952; Advanced Materials (www.advmat.de); Adv. Mater. 2021, 33, 2007952; Copyright 2021; 26 pgs.

OC Robotics successfully delivers new JetSnake system to Dragages/Bouygues joint venture in Hong Kong; https://www.ocrobotics.com/news-en/oc-robotics-successfully-delivers-new-jetsnake-system-to-dragagesbouygues-joint-venture-in-hong-kong/; which includes youtube link (Sep. 22, 2014) to—https://www.youtube.com/watch?v=AMd925MNO3g; 7 pgs.

U.S. Appl. No. 18/423,657, filed Jan. 26, 2024, entitled "System and Method for Servicing Aircraft Engines".

U.S. Appl. No. 18/423,657; Non-Final Office Action mailed Jun. 11, 2024; (pp. 15).

U.S. Appl. No. 18/423,657; Notice of Allowance mailed Sep. 11, 2024; (pp. 8).

U.S. Appl. No. 18/423,660, filed Jan. 26, 2024, entitled "Method and Apparatus for Servicing Engines".

U.S. Appl. No. 18/423,660; Non-Final Office Action mailed Jun. 12, 2024; (pp. 18).

U.S. Appl. No. 18/423,660; Notice of Allowance mailed Sep. 9, 2024; (pp. 8).

Website for Grainger—Cedarberg Opti Arm: Opti Arm, Opti-View Pac, Fits Cedarberg Brand; https://www.grainger.com/product/60UN62?gucid=N:N:PS:Paid:GGL:CSM-2295:4P7A1P:20501231&gad_source=1&gclid=CjOKCQiA35urBhDCARIsAOU7QwkvfL1Y9hbB4kH8zQ8PknSdv1IA-MiNJGGnX916AZtietBcNI6-nRUaAlvDEALw_wcB&gclsrc=aw.ds.

Website for MSC—Flexbar 12 Inch Long, Magnetic Indicator Base Flexible Arm on C-Clamp; https://www.mscdirect.com/product/details/06432512?cid=ppc-google-&mkwid=%7Cdc&pcrid=&rd=k&product_id=06432512&gad_source=1&gclid=CjOKCQiA35urBhDCARIsAOU7Qwl_ik6JX5MHhdsu5LxPMyDPkA9_HvGhwiFZXxu-fUOKT35bamtpnCAaAiKIEALw_wcB&gclsrc=aw.ds.

Website for MSC—Indicator Positioner & Holder; https://www.mscdirect.com/product/details/45445103?cid=ppc-google-&mkwid=%7Cdc&pcrid=&rd=k&product_id=45445103&gad_source=4&gclid=CjOKCQiA35urBhDCARIsAOU7Qwk44KGvETyEld7c3paSDMoEJSx35Qspjz3MgChbayx0moLoLQyyyhcaAksjEALw_wcB&gclsrc=aw.ds.

U.S. Appl. No. 18/978,930; Restriction Requirement Acton mailed Jun. 27, 2025; (pp. 1-7).

(56)          References Cited

OTHER PUBLICATIONS

U.S. Appl. No. 18/978,930; Notice of Allowance and Fees Due
(PTOL-85) mailed Sep. 16, 2025; (pp. 1-8).

Begin

Couple Snake-Arm Robot And Servicing Device ~702

Actuate Actuator To Move Snake-Arm Robot And Servicing Device ~704

Decouple Snake-Arm Robot And Servicing Device After Servicing Device Is Locked In Shape And Servicing Device And/Or Engine Servicing Apparatus Have Been Attached To The Engine ~706

Remove Snake-Arm Robot ~708

End

METHOD AND APPARATUS FOR SERVICING ENGINES

CROSS-REFERENCE TO RELATED APPLICATION(S)

This application is a divisional of U.S. application Ser. No. 18/423,660 filed Jan. 26, 2024, which is incorporated herein by reference in its entirety.

TECHNICAL FIELD

These teachings relate generally to robotic arm navigation within parts that are to be examined, inspected, worked upon, or maintained.

BACKGROUND

Snake-like robotic arms are longitudinally extended robotic devices (referred to as "snake-arm robots" herein) with many degrees of freedom that may be inserted into various environments for the purpose of performing inspections, maintenance, or repairs. These arms often include a large number of controlled joints, coupled to cameras or other sensors that are inserted into parts to be inspected.

For example, a snake-like robotic arm can be inserted into an engine to inspect the internal components of the engine. The large number of degrees of freedom of these devices allows them to be inserted into cluttered, confined, and/or otherwise non-accessible or difficult-to-access parts of the engine. The images and other information obtained by the camera can be analyzed for signs of damage, wear, or other issues, while repair and maintenance activity may extend the serviceable or useful life of the parts.

BRIEF DESCRIPTION OF DRAWINGS

Various needs are at least partially met through provision of the method and apparatus for inserting a servicing device into an engine using a snake-arm robot as described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
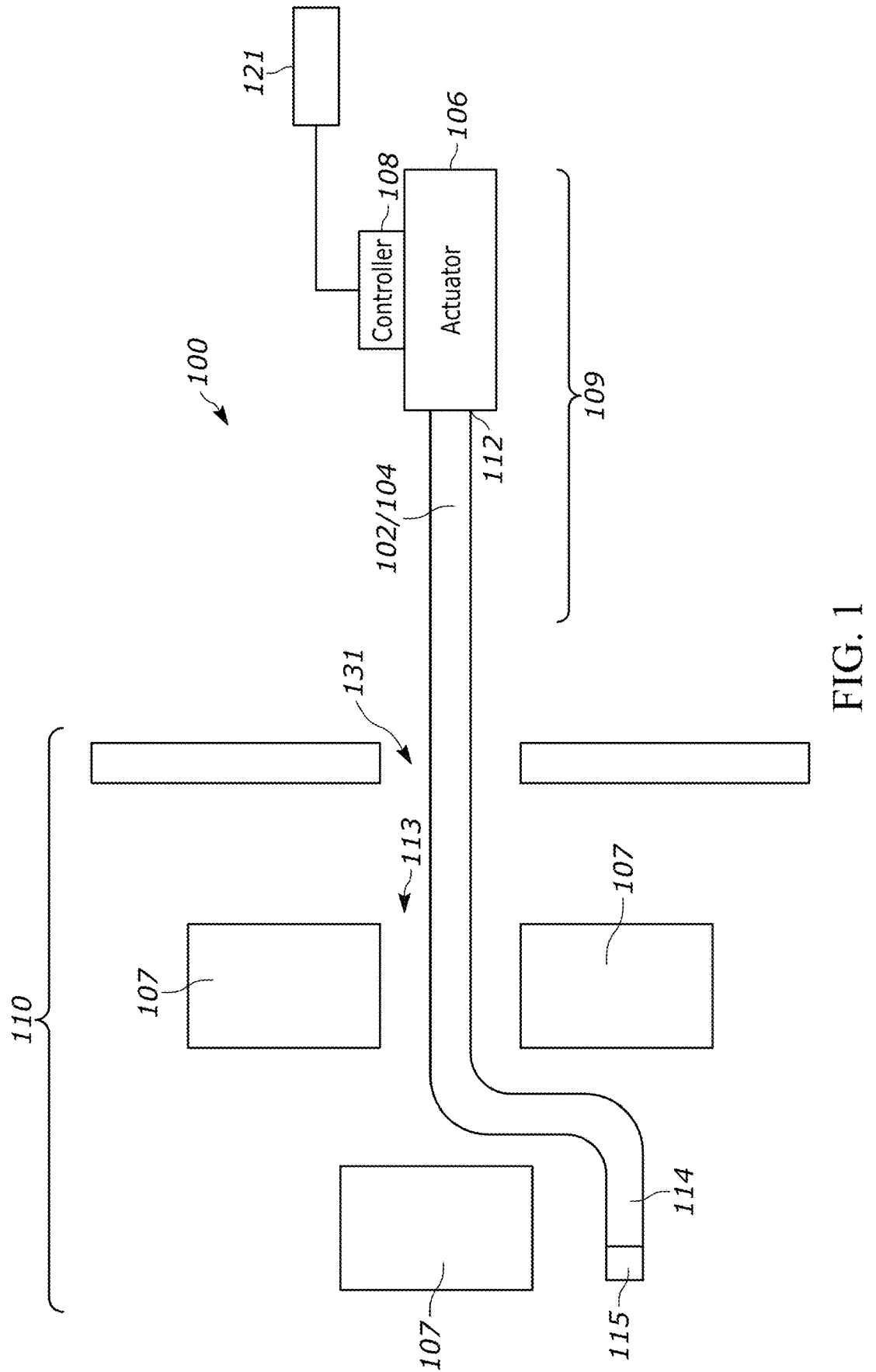
FIG. 1 comprises a diagram of an inspection and/or servicing system as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The approaches described herein provide the ability to service internal engine parts using a reusable servicing device (e.g., a flexible tube, a borescope, or a rigidizable guide tube) that is carried by a snake-arm robot to a desired destination. Once the destination is reached by the snake-arm robot, the snake-arm robot is removed from the engine leaving the servicing device in place at the destination. The approaches provided allow the servicing device to be effectively deployed at many locations within an engine that were unreachable using some previous approaches and at the same time allow the servicing device to be precisely placed at the destination thereby allowing tasks to be performed at the destination accurately and efficiently.

Servicing devices such as guide tubes are devices that can be used to position tools such as borescopes within aircraft engines to reach a destination. Guide tubes can be either rigid or flexible. Rigid devices may have the advantage of being able to be precisely positioned at some destination since their shape can be precisely defined. However, these rigid devices may also be limited in their usability over or across complex paths, such as inside an engine (typically reached through a borescope inspection (BSI) port), because their rigidity prevents some types of movements along these paths. On the other hand, flexible tubes may be more readily deployed along complex paths, but may not be able to achieve precision positioning at a destination due to their flexible shape. Whether rigid or flexible, these devices were typically not re-purposable, and a large number of guide tubes were often needed to enable a range of tasks to be performed.

The approaches provided herein utilize a snake-arm robot as a guide tube or guide rod to position servicing devices such as borescopes, flexible guide tubes, rigidizable guide tubes and other devices, to provide controllable program-mability and the ability to use these tools more flexibly. In some aspects, the snake-arm robots are of suitable scale and dimensions for positioning flexible devices through BSI ports in aircraft engines. Other uses are possible.

In other aspects, a snake-arm robot is used to position servicing devices such as flexible tubes with end hooks or gripping features (e.g., suction, magnetic, etc.) in place. The snake-arm robot is removed to enable process tools or other devices to be used through the attached, flexible tube. In this case, the snake-arm robot replaces the function of previously used J-tubes, and enables the same flexible device to be deployed to different positions in the same engine, and in different engines. In other words, the present approaches provide reusable devices.

In many of these embodiments, a snake-arm robot and a servicing device are mechanically coupled together. The snake-arm robot has a distal end and a proximal end. The proximal end is coupled to an actuator. In some examples disclosed herein, the mechanical coupling is accomplished by a longitudinal insertion of the snake-arm robot into the servicing device or the servicing device into the snake-arm robot.

The actuator may be actuated to produce a movement of the snake-arm robot through a passage within an engine until the distal end of the snake-arm robot reaches a desired location. The movement of the snake-arm robot is effective to concurrently move the servicing device through the passage. The movement occurs until a desired position of the servicing device is obtained at the desired location.

Subsequently, the snake-arm robot is de-coupled from the servicing device. The snake-arm robot is removed from the engine while leaving the servicing device in place within the engine.

The servicing device can take on a number of different forms. In examples, the servicing device comprises a rigidiz-able guide tube (RGT) that assumes a single predetermined shape, a RGT that assumes any of a plurality of arbitrary shapes, a borescope, or a flexible guide tube. Other examples are possible. In one particular example, the servicing device comprises a rigidizable guide tube (RGT) and the RGT is locked in shape at the desired location.

In other aspects, an engine servicing apparatus is released at the desired location. In examples, the desired location is a blade of the aircraft engine and the engine servicing apparatus comprises a blade rider device. Other examples are possible.

Positioning of the distal end of the snake-arm robot can be accomplished in various ways. For instance, positioning of the distal end of the snake-arm robot can be adjusted based upon feedback received from sensors. For example, images from a camera may be used to make manual or automatic adjustments.

The relative positioning of the snake-arm robot and servicing device can also vary. For example, the snake-arm robot is deployed within the servicing device. Alternatively, the servicing device is deployed within the snake-arm robot.

The combination of the snake-arm robot and the servicing device can enter the engine in a number of different ways. For example, the snake-arm robot and the servicing device may enter through an inspection port in the engine.

Movement of the snake-arm robot may be accomplished in different ways. For example, the snake-arm robot and the servicing device can be automatically guided to the desired location via a controller using a previously generated and previously stored description or recipe comprising, for example, a shape of the snake-arm robot or a path to guide the snake-arm robot. In other examples, the servicing device can be automatically guided to an objective location while automatically detecting obstacles and avoiding potential collisions using a sensor positioned at or near the distal end of the snake-arm robot. The servicing device can provide the sensor capability for this purpose, or the sensor may be a separate device. In other examples, the snake-arm robot and the servicing device are manually guided.

In others of these embodiments, a system includes a snake-arm robot and a servicing device. The snake-arm robot has a distal end and a proximal end, and the proximal end is coupled to an actuator. The servicing device is mechanically coupled to the snake-arm robot. The mechani-cal coupling is accomplished by a longitudinal insertion of the snake-arm robot into the servicing device or the servic-ing device into the snake-arm robot.

Actuation of the actuator is effective to produce a move-ment of the snake-arm robot through a passage of an engine until the distal end of the snake-arm robot reaches a desired location, the movement of the snake-arm robot being effec-tive to concurrently move the servicing device through the passage to a desired position at the desired location. The snake-arm robot is subsequently de-coupled from the ser-vicing device and removed from the engine while leaving the servicing device in place within the engine.

The terms and expressions used herein have the ordinary technical meaning as is accorded to such terms and expres-sions by persons skilled in the technical field as set forth above except where different specific meanings have other-wise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantita-tive representation that could permissibly vary without resulting in a change in the basic function to which it is related. Accordingly, a value modified by a term or terms such as "about", "approximately", and "substantially", are not to be limited to the precise value specified. In at least some instances, the approximating language may corre-spond to the precision of an instrument for measuring the value, or the precision of the methods or machines for constructing or manufacturing the components and/or sys-tems. For example, the approximating language may refer to being within a 10 percent margin.

The foregoing and other benefits may become clearer upon making a thorough review and study of the following detailed description.

Referring now to FIG. 1, one example of a system 100 for controlling the movement of a snake-arm robot 102 and a servicing device 104 is described. The system 100 includes the snake-arm robot 102, the servicing device 104, an actuator 106, and a controller 108. In FIG. 1, the snake-arm robot 102 and the servicing device 104 are shown together, but it will be appreciated that either the snake-arm robot 102 is inserted into the servicing device 104, or the servicing device 104 is inserted into the snake-arm robot 102 along a length of the snake-arm robot 102. The snake-arm robot 102 has a proximal (or root) end 112 and a distal end 114. The proximal end 112 is coupled to the actuator 106. The distal end 114 may include a camera, sensor, or other device (either coupled to or associated with the servicing device 104 or associated with an engine servicing apparatus 115).

The actuator 106 and the controller 108 are disposed at an exterior 109 of an engine 110. The actuator 106 may be a motor or some other drive mechanism. Other examples are possible.

The engine 110 includes engine components 107. The engine components 107 may be moving and/or non-moving components of an aircraft engine such as fan blades, frames, or shafts to mention a few examples.

The snake-arm robot 102 is structured so as to have the ability to advance longitudinally along its own length thus enabling it to follow a serpentine path. This has the advantage that devices of this type may be used in circumstances where access to a work site is severely restricted. However, the snake-arm robot 102 can also move in other modes than advancing longitudinally along a path, for example, by changing the attitude and position of the snake-arm robot 102 without moving the base driving the arm to cause the snake-arm robot 102 to move along a path. Other movements are also possible.

In aspects, control of the snake-arm robot 102 is made with a multiplicity of tendons such as ropes or, more specifically, wire ropes or cables, each rope connected at one point within the plurality of links of the arm at one end of the rope and connected to the actuator 106, which is configured to apply a force and displacement at the other end of the rope. The actuator 106 is coupled to and controls movement of these structures and thus movement and shape of the snake-arm robot 102. In aspects, wire rope actuation or Bowden-cable actuation is provided to enable wave-like motion. Wave-like motion can be achieved without cable construction, as well. Wave-like motion may be used while simultaneously advancing or retracting the snake-arm robot 102 so that the wave motion has the effect of causing the snake-arm robot 102 to avoid obstacles. In this manner, the body of the snake-arm robot 102 may remain close to a nominal path while advancing forward or retracting. The snake-arm robot 102 may include a tip portion (or work head) adapted to carry a sensor (or tool or other examination element) for work, examination, or inspection of a passage 113.

The servicing device 104 can take a variety of different forms. In aspects, the servicing device comprises a rigidizable guide tube (RGT) that assumes a single predetermined shape, a RGT that assumes any of a plurality of arbitrary shapes, a borescope, or a flexible guide tube. Other examples of servicing devices are possible.

RGT devices may have individual links that are connected by wires or cables. Initially, the RGT device may be in a flexible or semi-flexible state. However, when the wires or cables are tightened, then the links may come together such the RGT device assumes a shape.

In some aspects, the RGT device may be configured to assume only a single shape. The shape is pre-defined, and the connections between links are shaped to engage to produce only the one resultant, predefined shape. Some of these devices may employ constant joint friction to hold shape and there is no actuation to change the stiffness. In aspects, the devices may utilize a ball and cup construction.

In other examples, the RGT device is a stiffenable device which can be stiffened in any arbitrary shape. One advantage of this is that the snake-arm robot 102 does not have to overcome a high stiffness of the device in order to change shape.

The servicing devices 104 may also be tubes made of materials with electro-programmable stiffness, or sleeves with electrostatically attractive beads, or sleeves with beads inside, squeezed together using a vacuum to mention a few examples. In these configurations, the snake-arm robot 102 is removed to enable the rigidized tube to be used in a fixed, but programmable position. In still other examples, the servicing device 104 is a stainless steel series of cups and spheres with holes through them, rigidized with ropes inside the periphery, which has been used to stiffen a passively adjustable base of a snake-arm robot.

The servicing device 104 may also be a flexible guide tube with hooks that enable flex borescopes to be used. The approaches provided herein provide a controllable, programmable solution to positioning such guide tubes (and others) along paths which would otherwise be impossible to achieve.

The servicing device 104 can be used to position the engine servicing apparatus 115. In these regards, the engine servicing apparatus 115 is carried by, coupled to, attached, to, and/or incorporated with the servicing device 104. The engine servicing apparatus 115 can be any device that it is used to provide specialized maintenance operations within the engine 110 and include devices such as drills, saws, ablation devices, sanders, cameras, sensors, or grinders to mention a few examples. The engine servicing apparatus 115 can also include mechanisms or structures which serve to secure it to parts of the engine 110. The engine servicing apparatus 115 may detach from the servicing device 104 or remain attached to the servicing device 104. The engine servicing apparatus 115 may be a blade rider. A blade rider may be an inspection, maintenance or servicing device configured to be inserted into a gas turbine engine through a borescope port, an ignitor port or any other suitable aperture connecting an external space adjacent to the engine to an internal volume of the engine, and further configured to attach or be attached to a moving part of a gas turbine engine for example to a compressor blade or to a turbine blade, so as to be transported within the gas turbine engine by rotation of a gas turbine engine rotor, in order to perform a function such as inspection, maintenance or servicing of a stationary part of the gas turbine engine for example a vane, a stator, a nozzle, a shroud, a lining, a casing or a seal. The method of attachment may include adhesion, suction, magnetism, electromagnetism, mechanical clipping or frictional connection for example by configuring a device to fit closely between two adjacent blades on an engine rotor, or by configuring a balloon or a spring to urge a part of the blade rider to contact a surface of the moving part to produce a reaction force and a frictional connection between the blade rider and the engine.

One such application is now described. In this example, the servicing device 104 carries and/or positions the engine servicing apparatus 115 in the primary cavity of a turbine assembly of the engine 110.

In aspects, the engine servicing apparatus 115 is positioned between adjacent blades of the turbine assembly of the engine 110. In addition, the engine servicing apparatus 115 is configured to move through the primary flowpath of the turbine assembly. Accordingly, the engine servicing apparatus 115 facilitates maintenance of the turbine assembly. For example, the engine servicing apparatus 115 (when used with the snake-arm robot 102 and servicing device 104) facilitates inspection and repair of the turbine assembly at locations within the primary flowpath that are difficult to access from an exterior of the turbine assembly by conventional means, such as using a borescope tool.

As mentioned, the engine servicing apparatus 115 can be positioned within the primary flowpath using the servicing device 104. In some embodiments, the servicing device 104 is used to position the engine servicing apparatus 115 adjacent rotating components of the turbine assembly such as blades of the turbine assembly, and the rotating components are subsequently used to position the engine servicing apparatus 115 relative to stationary components of the turbine assembly.

During operation and in some aspects, the engine servicing apparatus 115 enters the turbine assembly through any suitable access port or opening of the turbine assembly. For example, in some embodiments, the engine servicing apparatus 115 together with the combination of the snake-arm robot 102 and the servicing device 104 enters and/or exits turbine assembly through any of an inlet, an exhaust, and/or an access port, such as an igniter port, a borescope port, or a fuel nozzle port or any other port which may be purposed to provide access by the temporary removal of a component of the gas turbine engine. In the exemplary embodiment, the engine servicing apparatus 115 is sized and shaped to fit within the turbine assembly and to travel through the turbine assembly, such as through the primary cavity of the turbine assembly. For example, the engine servicing apparatus 115 has a height, length, and width that are less than a clearance required to fit within the primary flowpath. The height, length, and width define a volume of the engine servicing apparatus 115. In alternative embodiments, the engine servicing apparatus 115 is any size and shape that enables the engine servicing apparatus to operate as described herein.

During operation, the engine servicing apparatus 115 could be used to inspect and/or repair any interior components of the turbine assembly. For example, in some embodiments, the engine servicing apparatus 115 is positioned adjacent a portion of interior surface of the turbine assembly. The interior surface could be any surface within the primary flowpath of the turbine assembly. For example, in some embodiments, the interior surface includes, without limitation, surfaces of blades, guide vanes, and shrouds. In some embodiments, the engine servicing apparatus 115 detects a characteristic of the interior surface. For example, in some embodiments, the engine servicing apparatus 115 is used to generate an image of the interior surface and the image is examined to determine the condition of the turbine assembly and assess whether repairs are necessary. If repairs are necessary, in some embodiments, the engine servicing apparatus 115 is used to repair the interior surface. For example, in some embodiments, the engine servicing apparatus 115 removes and/or replaces a damaged portion of interior surface.

In some aspects, the snake-arm robot 102 includes a hollow interior portion along its longitudinal length allowing the servicing device 104 to be inserted through the snake-arm robot 102. In other examples and as mentioned, the snake-arm robot 102 may be inserted through the servicing device 104.

The actuator 106 may be a motor or other device that pushes the snake-arm robot 102 and also actuates the wire ropes or cables of the snake-arm robot 102. In some cases, the snake-arm robot 102 is pushed by a person (e.g., initially inserting the snake-arm robot 102 into the engine 110).

In some other examples, the actuator 106 obtains instructions defining a goal (e.g., a destination within the passage) for the tip portion of the snake-arm robot 102. In these regards, the controller 108 may be coupled to a user interface 121 to allow an operator to enter commands that specify the destination. For example, the user interface 121 may comprise a joystick. In another example, the ultimate destination is unknown at the start of the operation, and the operator may use the user interface 121 to steer the snake-arm robot 102 interactively in an exploratory mode. Other examples of operator input are possible.

The controller 108 is coupled to the snake-arm robot 102. In some aspects, the controller 108 is disposed at or within the actuator 106. It will be appreciated that as used herein the term "controller" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The controller 108 may be configured (for example, by using corresponding programming stored in a memory as will be well understood by those skilled in the art) to carry out one or more of the steps, actions, and/or functions described herein.

It will be appreciated that the approaches used can be used for insertion of the snake-arm robot 102 and the servicing device 104 (and the engine servicing apparatus 115 if used) into the passage 113 of the engine 110. Further, the approaches are used to control movement of the snake-arm robot 102 out of the passage 113 while leaving the servicing device 104 (and potentially the engine servicing apparatus 115) in place within the passage 113.

The snake-arm robot 102 is flexible and is inserted into the passage 113 within the engine 110 (to be examined, inspected, worked upon, maintained, or machined) at an insertion point (or opening) 131 in a wall or casing of the engine 110. The snake-arm robot 102 has multiple degrees of freedom as it moves through the passage 113.

In another example of the operation of the system of FIG. 1, the snake-arm robot 102 and the servicing device 104 are mechanically coupled together. The mechanical coupling is accomplished by a longitudinal insertion of the snake-arm robot 102 into the servicing device 104 (or the servicing device 104 into the snake-arm robot 102). The mechanical coupling involves the pressing of surfaces of the snake-arm robot 102 against surfaces of the servicing device 104.

The actuator 106 is actuated to produce a movement of the snake-arm robot 102 through a passage within an engine until the distal end of the snake-arm robot 102 reaches a desired location. The movement of the snake-arm robot 102 is effective to concurrently move the servicing device 104 through the passage 113. The movement occurs until a desired position of the servicing device 104 is obtained at the desired location. During these operations, the engine servicing apparatus 115 is positioned at the desired location because it has been carried and/or moved with the servicing device 104.

Subsequent to be inserted into the engine 110, the snake-arm robot 102 is de-coupled from the servicing device 104. The snake-arm robot 102 is removed from the engine 110 while leaving the servicing device 104 (and the engine servicing apparatus 115) in place within the engine 110. Removal can be accomplished by the actuator 106.

Figure 2A:
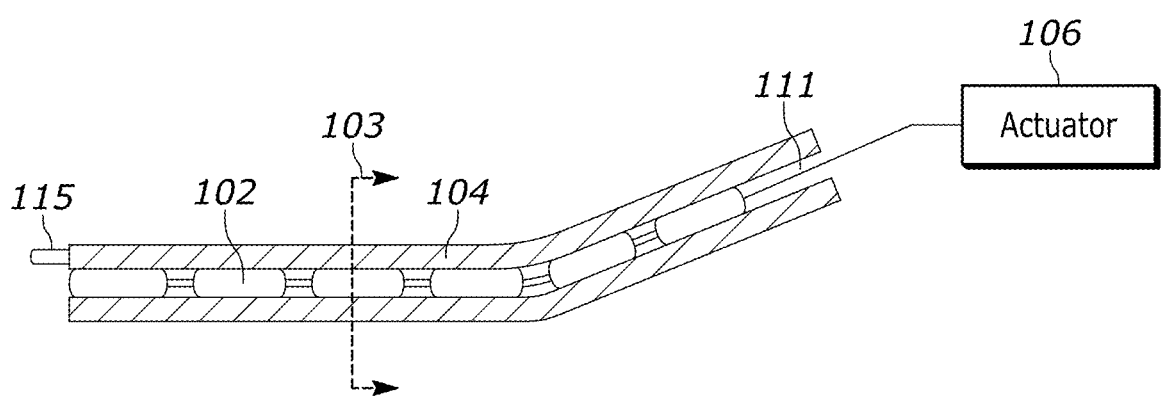
FIG. 2A comprises a diagram of a snake-arm robot and servicing device as configured in accordance with various embodiments of these teachings.
Figure 2B:
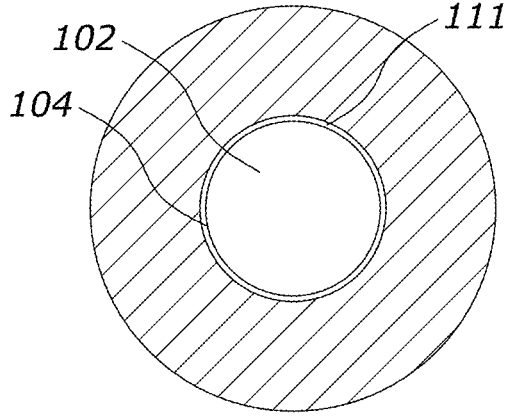
FIG. 2B comprises a cross-sectional diagram of the apparatus of FIG. 2A taken along line 103 as configured in accordance with various embodiments of these teachings.
Figure 3A:
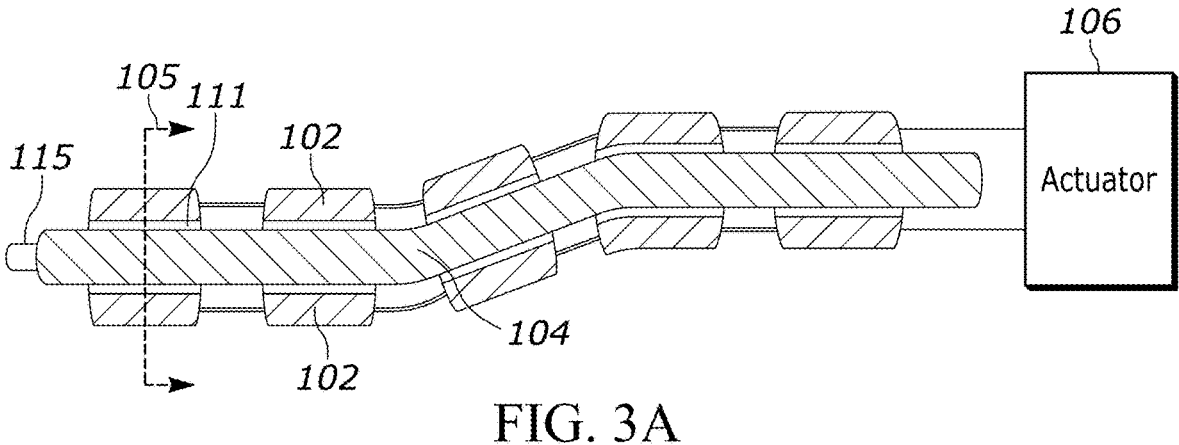
FIG. 3A comprises a diagram of a snake-arm robot and servicing device as configured in accordance with various embodiments of these teachings.
Figure 3B:
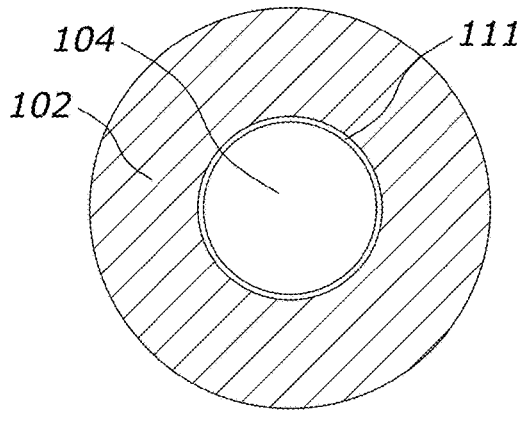
FIG. 3B comprises a cross-sectional diagram of the apparatus of FIG. 3A taken along line 105 as configured in accordance with various embodiments of these teachings.

Turning briefly now to FIGS. 2A and 2B, an example of the snake-arm robot 102 being inserted inside the servicing device 104 is shown. FIG. 2B shows a cross section taken along a line labeled 103. Turning briefly now to FIGS. 3A and 3B, an example of the servicing device 104 being inserted inside the snake-arm robot 102 is shown. FIG. 3B shows a cross section taken along a line labeled 105. Whether the outer-most element is the sake-arm robot 102 or the servicing device 104 in aspects a central channel extends through and along the center of the outer element. As mentioned, the servicing device 104 and the snake-arm robot 102 may be held together by mechanical tension (e.g., friction) during the insertion operation into the engine 110. In these regards, the diameters of each of the snake-arm robot 102 and the servicing device 104 are selected so that one of these elements can be inserted into the other and the inner element can be moved through the outer element when needed by application of a force, but the inner element and outer element still be held in place by mechanical tension between surfaces of the inner and outer element when the inner element is not being moved.

Figure 9A:
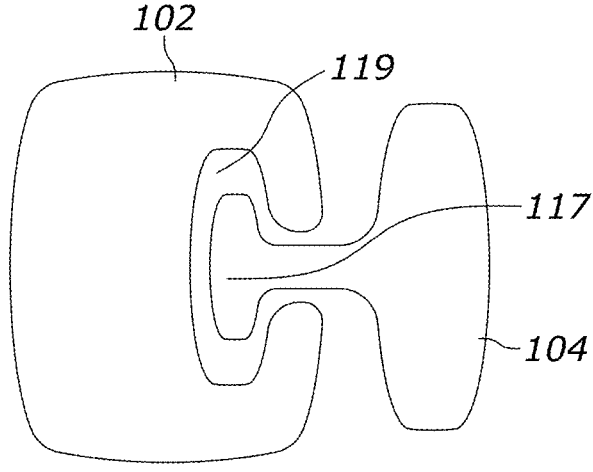
FIGS. 9A and 9B comprise cross-sectional diagrams of further examples of snake-arm robot and servicing device arrangements as configured in accordance with various embodiments of these teachings.
Figure 9B:
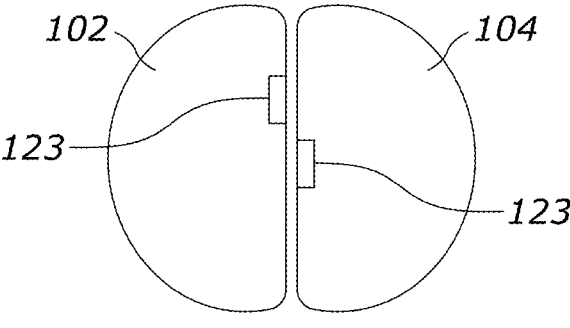

Turning briefly to FIGS. 9A and 9B, cross sections of other examples of securing the snake-arm robot 102 and the servicing device 104 are shown. As shown in FIG. 9A, a mechanical connection is formed between the snake-arm robot 102 and the servicing device 104 inserting an extension 117 of the servicing device 104 into a cavity 119 of the snake-arm robot 102. Other suitable attachment mechanisms such as hooks or latches could also be used. It will also be appreciated that the configurations of the components shown in FIG. 9A could be reversed (e.g., the snake-arm robot 102 may have an extension that first into a cavity of the servicing device 104).

As shown in FIG. 9B, the snake-arm robot 102 and servicing device 104 may attach by some non-invasive switchable mechanism 123 such as by magnetic coupling or suction coupling. The two components may be attached or detached by actuating or de-actuating the mechanism (e.g., turning on or off electromagnets that hold the snake-arm robot 102 and the servicing device 104). Although the switchable mechanism 123 is shown in both the snake-arm robot 102 and the servicing device 104, it will be appreciated that the switchable mechanism 123 may be located in only one of the snake-arm robot 102 and the servicing device 104.

Figure 4A:
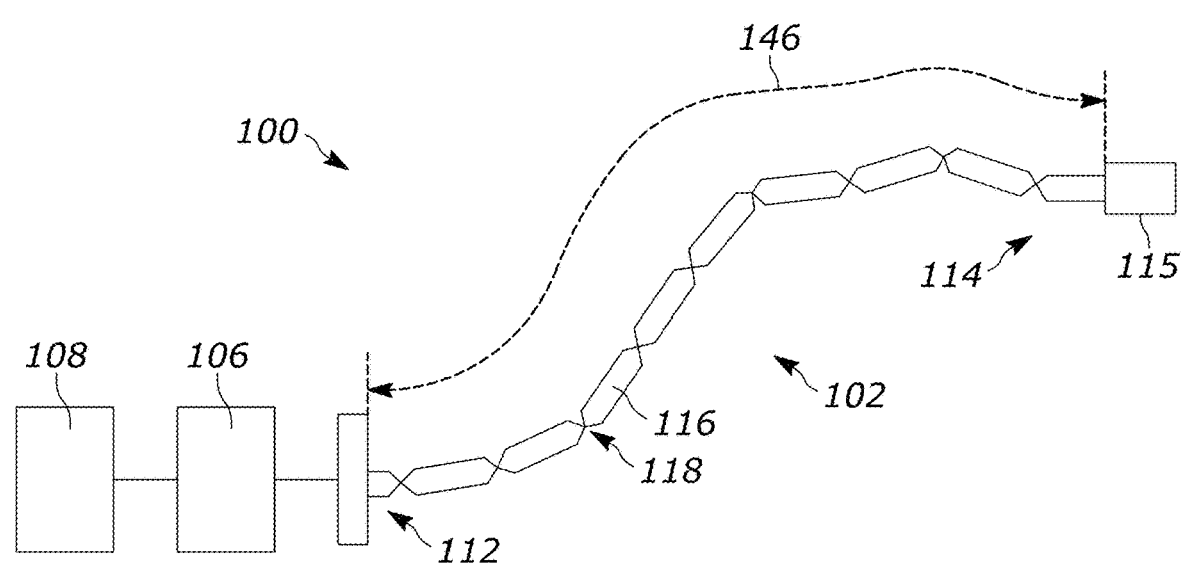
FIG. 4A comprises a diagram of a snake-arm robot as configured in accordance with various embodiments of these teachings.

Referring now to FIG. 4A, a snake-arm robot 102 that can be used with the approaches provided herein is described. The actuator 106 may include one or more motors. A controller 108 is electrically coupled to the actuator 106. Further, the snake-arm robot 102 extends generally between the proximal (or root) end 112 and the distal end 114.

The snake-arm robot 102 depicted is generally formed of a plurality of links 116 and a plurality of joints 118, with the plurality of links 116 sequentially arranged and movably coupled to one another with the plurality of joints 118 along a length 146.

Figure 4B:
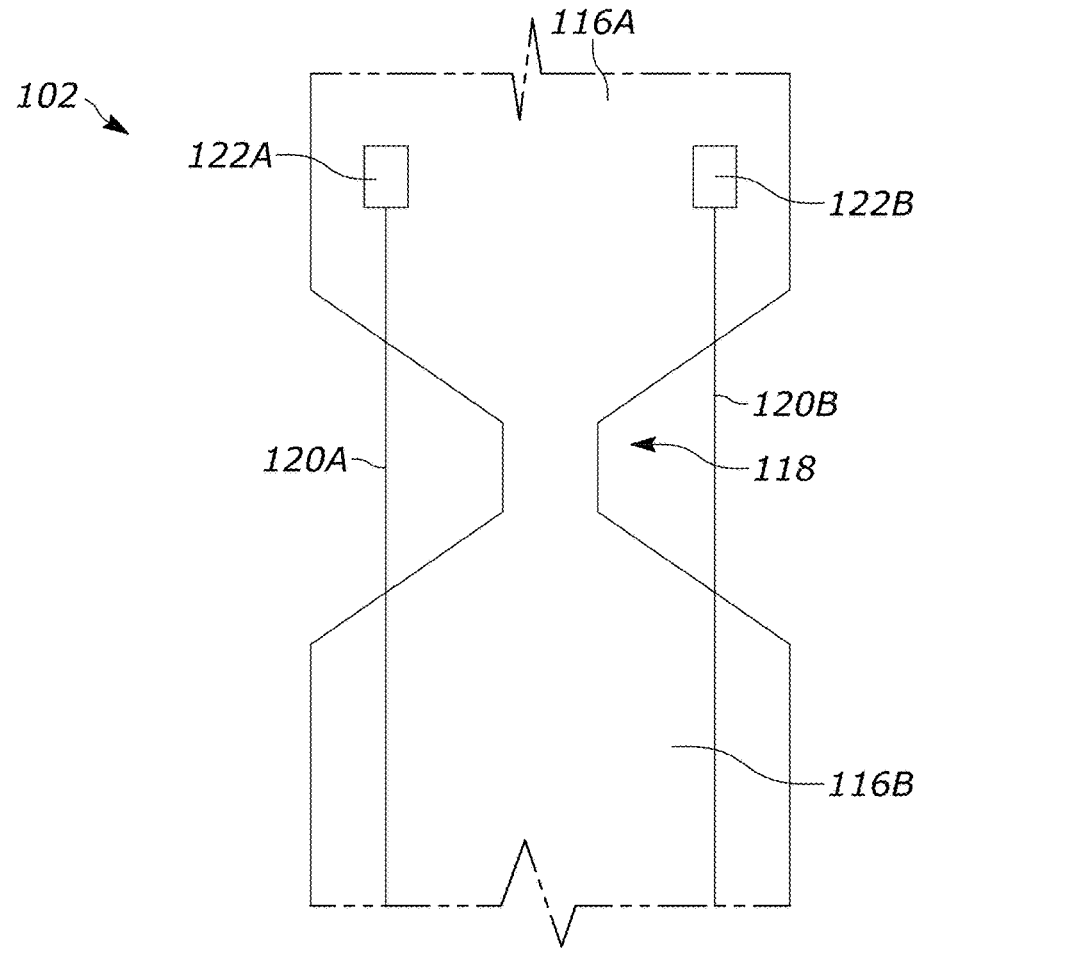
FIG. 4B comprises a diagram of a portion of the snake-arm robot of FIG. 4A as configured in accordance with various embodiments of these teachings.

Referring now also to FIG. 4B a snake-arm robot 102 is shown in greater detail. FIG. 4B shows a close-up, schematic view is provided of an adjacent pair of links 116 (i.e., a forward link 116A and an aft link 116B) of the snake-arm robot 102 and a joint 118 of the exemplary snake-arm robot 102 of FIG. 4A. For the embodiment depicted, the joint 118 is configured as a flexural joint. More specifically, the joint 118 is a section of substantially reduced cross-sectional area as compared to links 116, such that the two adjacent links 116 may bend relative to one another at the joint 118. Further, it will be appreciated that for the embodiment depicted, the snake-arm robot 102 includes a plurality of control wires 120A and 120B extending therethrough. For illustrative purposes, two control wires 120A and 120B are depicted in FIG. 4B (a first control wire 120A and a second control wire 120B), with each of the first and second control wires 120A, 120B terminating at the forward link 116A of the depicted pair of links 116. Accordingly, it will be appreciated that the first and second control wires 120A, 120B are each moveably positioned within (e.g., slidable relative to) the aft link 116B and are fixedly attached to the forward link 116A. More particularly, the first control wire 120A includes a first anchor 122A fixed to one side of the forward link 116A and the second control wire 120B includes a second anchor 122B fixed to another side of the forward link 116A. It will be appreciated, however, that in other exemplary embodiments, the first and second control wires 120A, 120B may be fixedly attached to the forward link 116A in any other suitable manner.

In order to bend the forward link 116A relative to the aft link 116B, one of the first control wire 120A or second control wire 120B may be pulled by, e.g., actuator 106. For example, in order to bend the forward link 116A clockwise in the prospective depicted in FIG. 4B, the second control wire 120B may be pulled by the actuator 106, while tension may be relieved in the first control wire 120A. Conversely, in order to bend the forward link 116A counterclockwise in the prospective depicted in FIG. 4B, the first control wire 120A may be pulled by the actuator 106, while tension may be relieved in the second control wire 120B.

It will be appreciated that although only two control wires 120A, 120B are depicted in FIG. 4B, in other embodiments, each link 116 may have any other suitable number of control wires terminating at such link 116 for controlling such link 116, or alternatively, certain links 116 of the snake-arm robot 102 may have no control wires terminating at such link 116 (e.g., a bend applied by one set of ropes may be distributed amongst several links 116 and associated joints 118). For example, in certain embodiments, each link 116 may include three control wires terminating at such link 116 to provide additional degrees of freedom for such link 116. Further, while only two wires are depicted in FIG. 4B, a relatively large number of additional control wires may extend through such links 116 for controlling each of the links 116 forward of the links 116 depicted. By way of example only, if the snake-arm robot 102 were to include twenty links 116, with each link 116 including three control wires terminating at such link 116, a link 116 proximate the root end 112 of the snake-arm robot 102 may include approximately sixty control wires extending therethrough. Further, additional wires may extend therethrough for, e.g., electrical connections for the engine servicing apparatus 115 and/or for the provision of working fluids for the engine servicing apparatus 115.

Figure 5A:
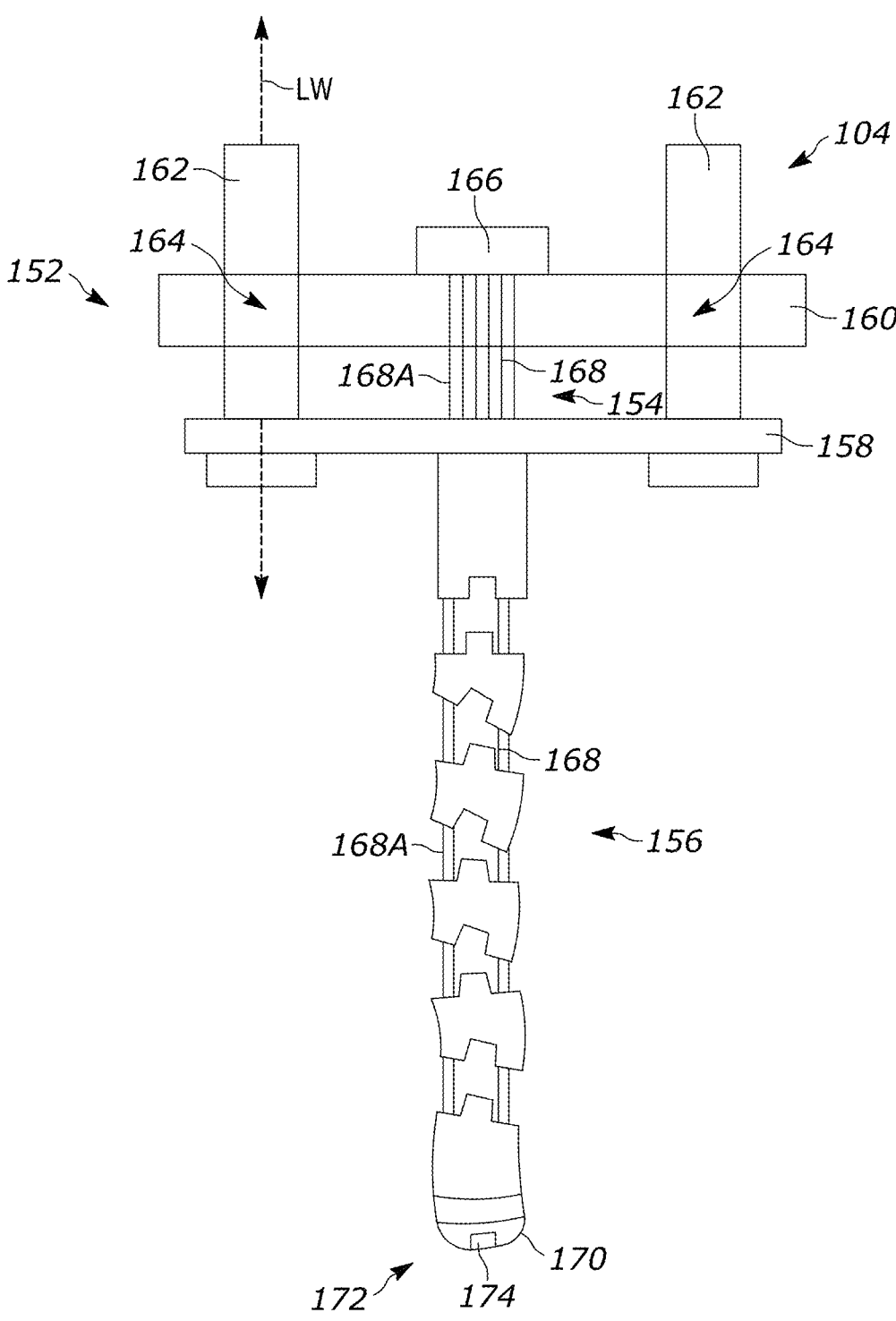
FIG. 5A comprises a diagram of a servicing device in the slackened state as configured in accordance with various embodiments of these teachings.
Figure 5B:
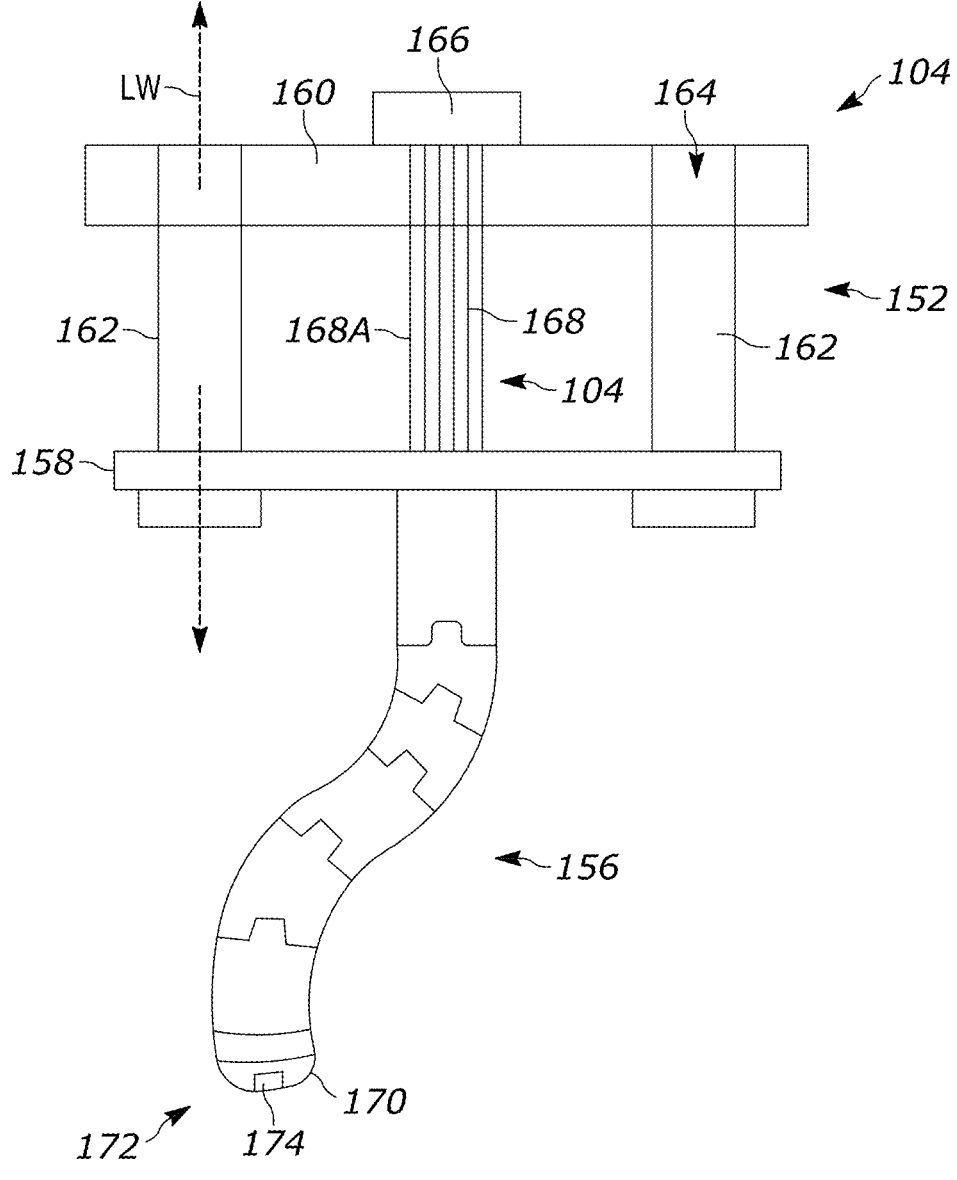
FIG. 5B comprises a diagram of a servicing device in the tensioned state as configured in accordance with various embodiments of these teachings.

Referring now to FIG. 5A a schematic view of one example of the servicing device 104 is shown. In examples, the servicing device 104 is a selectively flexible extension tool that may be used to carry out various operations within the engine 110 (FIG. 1). FIG. 5A shows the exemplary servicing device 104 in a slacked position. FIG. 5B is a schematic view of the exemplary servicing device 104 of FIG. 5A in a tensioned position.

The servicing device 104 includes a base 152, a line assembly 154, and a plurality of sequentially arranged links 156. The base 152 generally includes a first plate 158, a second plate 160, and one or more extension guides 162. For the example depicted, the one or more extension guides 162 includes a pair of extension guides 162 fixedly coupled to the first plate 158 and extending in a lengthwise direction LW. The second plate 160 of the base 152 includes openings 164 corresponding to the pair of extension guides 162, such that the second plate 160 is slidable along the extension guides 162 in the lengthwise direction LW away from the first plate 158 and towards the first plate 158.

The line assembly 154 generally includes a root 166 coupled to the second plate 160 of the base 152 and a plurality of lines 168 extending from the root 166. The plurality of lines 168 includes a first line 168A, and the first line 168A (along with the rest of the lines 168 for the embodiment shown) is operable with the plurality of sequentially arranged links 156 to move the plurality of sequentially arranged links 156 between the slacked position (FIG. 5A) and the tensioned position (FIG. 5B). The plurality of sequentially arranged links 156 are spaced from one another when in the slacked position to allow the plurality of sequentially arranged links 156 to pivotably move relative to one another. By contrast, the plurality of sequentially arranged links 156 are pressed against one another when in the tensioned position to rigidly fix the plurality of sequentially arranged links 156 to one another.

As noted, for the embodiment shown, each of the plurality of lines 168 is operable with the plurality of sequentially arranged links 156 to move the plurality of sequentially arranged links 156 between the slacked position and the tensioned position. It will be appreciated that each of these lines 168 may be configured as cables, ropes, threads, etc. Accordingly, it will be appreciated that the lines 168 are generally flexible (i.e., will not prevent the plurality of sequentially arranged links 156 from pivotably moving relative to one another in the slacked position).

Briefly, for the embodiment depicted, it will be appreciated that the servicing device 104 depicted in FIGS. 5A and 5B is a tool member including a tool implement 170 (which may be the engine servicing apparatus 115) coupled to one of the plurality of links 156. More specifically, the servicing device 104 defines a distal end 172, and the tool implement 170 is coupled to the link 156 at the distal end 172. For the embodiment shown, the tool implement 170 includes one or more sensors, cameras, or both, and more specifically includes a sensor 174. The one or more sensors, cameras, or both may be operably coupled to a controller or other device (not shown) through one or more electric lines extending through the plurality of sequentially arranged links 156. Alternatively, the sensor 174 may be incorporated (along with potentially other devices) in the engine servicing apparatus 115 as discussed elsewhere herein.

Referring now to FIG. 6A, FIG. 6B, FIG. 6C, and FIG. 6D, one example of inserting the combined apparatus of the snake-arm robot 102 and the servicing device 104 into the engine 110, positioning the snake-arm robot 102 and the servicing device 104 within the engine 110, and then removing the snake-arm robot 102 from the engine 110 while leaving the servicing device 104 in place is described. In this example, the snake-arm robot 102 has been inserted inside the servicing device 104. However, the approaches described with respect to FIG. 6A, FIG. 6B, FIG. 6C, and FIG. 6D would be applicable if the servicing device 104 were inserted within the snake-arm robot 102.

Figure 6A:
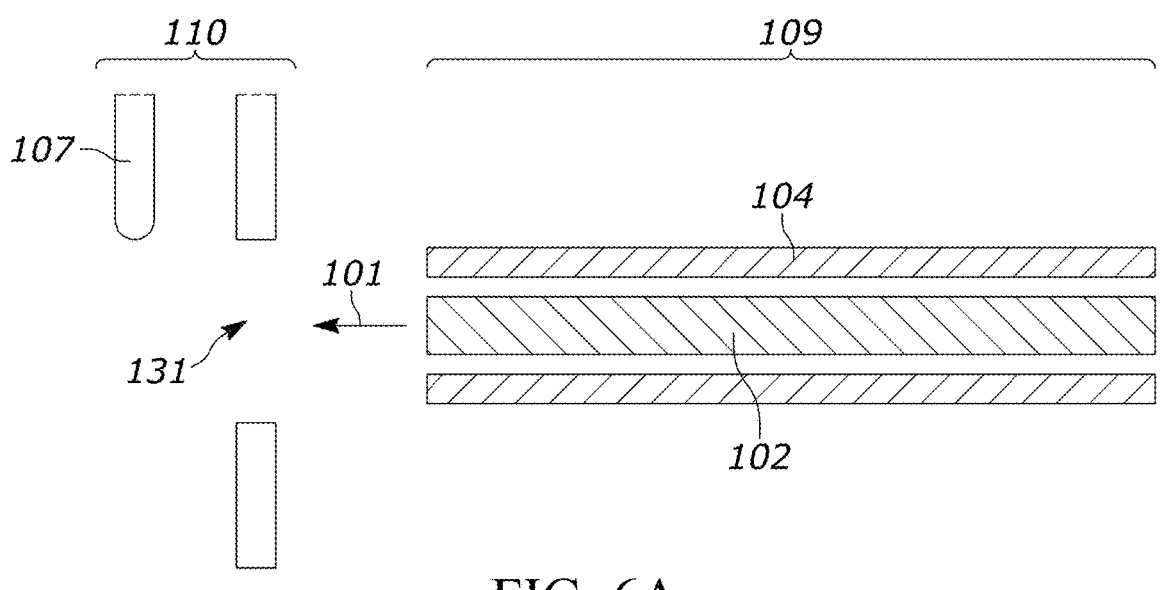
FIG. 6A comprises a diagram of inserting a snake-arm robot and servicing device into an engine as configured in accordance with various embodiments of these teachings.

Referring to FIG. 6A, the combination of the servicing device 104 and the snake-arm robot 102 to be inserted into the engine 110 is shown at that time as being at the exterior 109 of the engine 110. The combination of the snake-arm robot 102 and the servicing device 104 are inserted into the engine 110 through the insertion point or opening 131. The insertion occurs by moving the combination of the snake-arm robot 102 and the servicing device 104 in the direction indicated by the arrow labeled 101.

Figure 6B:
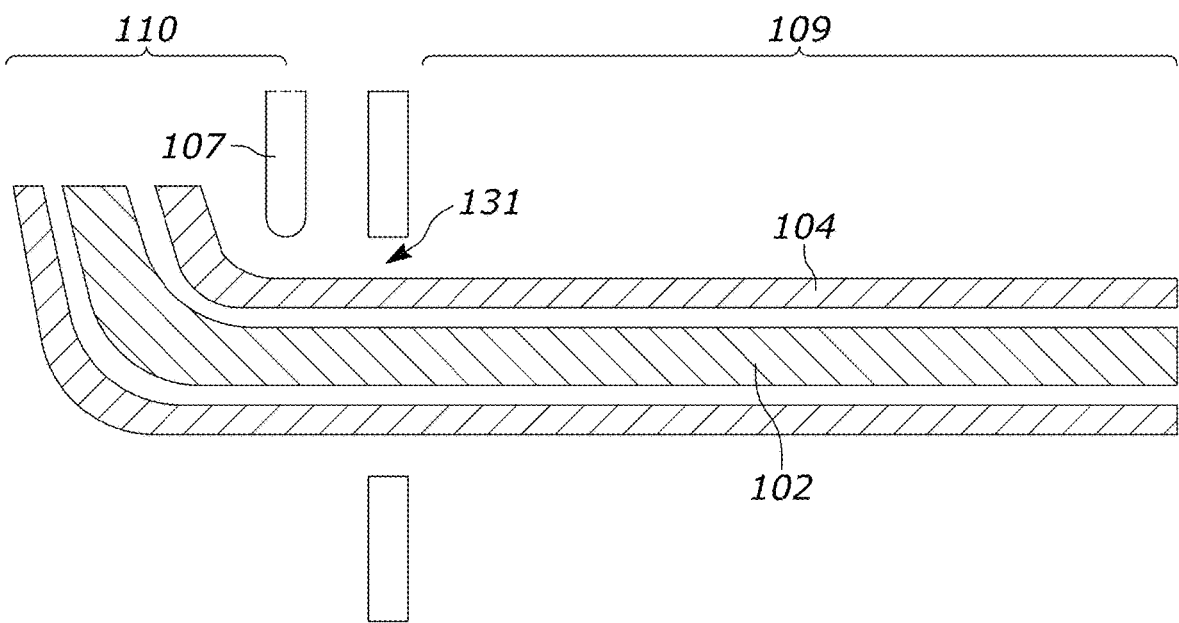
FIG. 6B comprises a diagram of further inserting a snake-arm robot and servicing device into an engine as configured in accordance with various embodiments of these teachings.

Referring to FIG. 6B, the combination of the snake-arm robot 102 and the servicing device 104 have been inserted into the engine 110 in the vicinity of the engine components 107. Movement is halted. At this point, the servicing device 104 has been manually or automatically stiffened, tensioned, and/or locked into a desired position and/or orientation as described elsewhere herein.

It will be appreciated that the servicing device 104 may include various tools or other devices that can be used to perform operations within the engine or at or on the engine components 107. For example, the servicing device 104 may include the engine servicing apparatus 115 (FIG. 1) that includes cameras, drills, saws, and other types of sensors as has been described elsewhere herein.

Figure 6C:
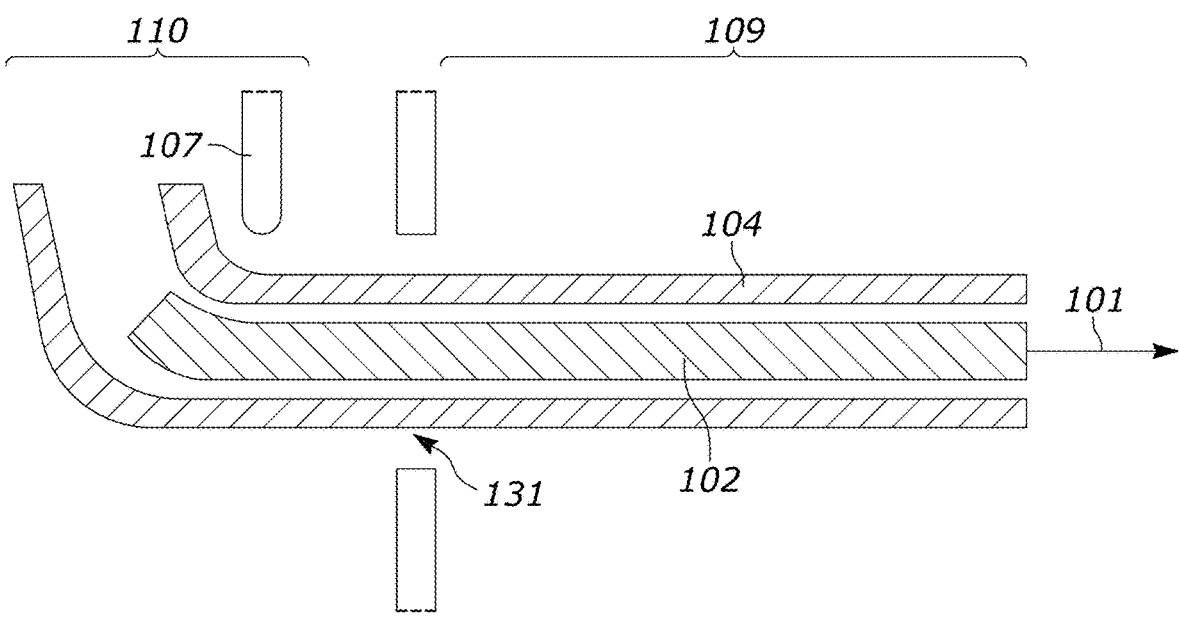
FIG. 6C comprises a diagram of removing a snake-arm robot and servicing device into an engine as configured in accordance with various embodiments of these teachings.

Referring to FIG. 6C, the snake-arm robot 102 is beginning to be removed from the engine 110. The direction of movement is outward from the engine 110 in the direction indicated by the arrow labelled 101.

Figure 6D:
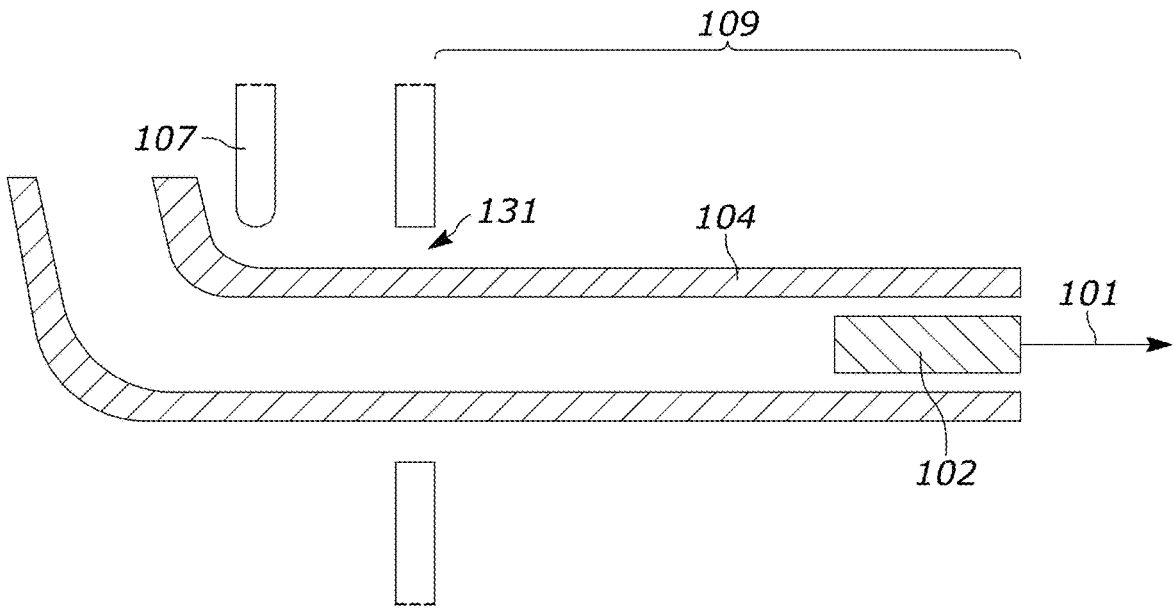
FIG. 6D comprises a diagram of further removing a snake-arm robot and servicing device into an engine as configured in accordance with various embodiments of these teachings.

Referring to FIG. 6D, the snake-arm robot 102 is now entirely removed from the engine 110 and movement is continuing in the direction indicted by the arrow labeled 101. Eventually, the movement is halted. The movement may be made by an actuator (e.g., the actuator 106), manually, or a combination of these approaches.

Figure 7:
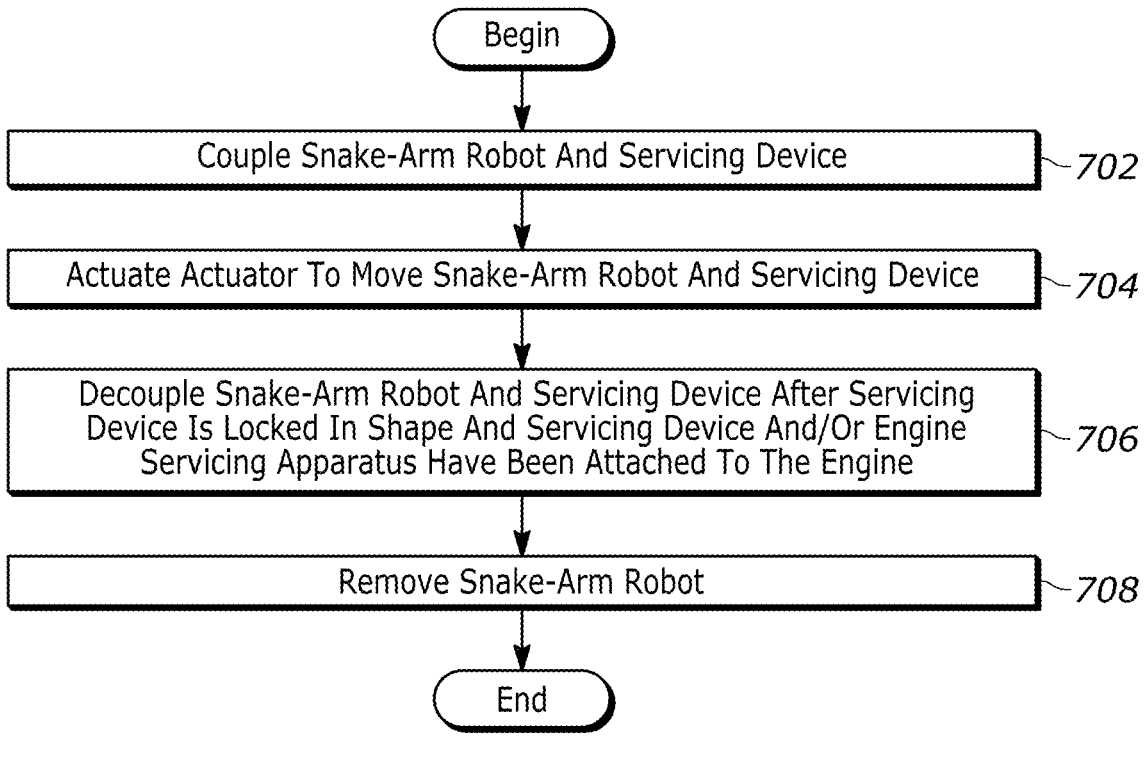
FIG. 7 comprises a flowchart as configured in accordance with various embodiments of these teachings.

Referring now to FIG. 7, one example of an approach for moving a servicing device into an engine is described. At step 702, the snake-arm robot 102 and the servicing device 104 are mechanically coupled together. The proximal end 112 of the snake-arm robot 102 is coupled to the actuator 106. The mechanical coupling is accomplished by a longitudinal insertion of the snake-arm robot 102 into the servicing device 104 or the servicing device 104 into the snake-arm robot 102. In aspects, the mechanical coupling is provided by friction between the two parts after the insertion of one into the other. The outer element (whether the snake-arm robot 102 or the servicing device 104) may be held while the other inserted. Insertion may be accomplished either manually or in an automated approach (e.g., using a robot).

At step 704, the actuator 106 is actuated to produce a movement of the snake-arm robot 102 through the passage 113 within the engine 110 until the distal end 114 of the snake-arm robot 102 (and/or a distal end of the servicing device 104) reaches a desired location. The movement of the snake-arm robot 102 is effective to concurrently move the servicing device 104 through the passage 113. The movement occurs until a desired position of the servicing device 104 is obtained at the desired location.

Subsequent to insertion and arrival at the destination, at step 706, the snake-arm robot 102 is de-coupled from the servicing device 104. Decoupling may be accomplished by applying a force in the direction opposite of insertion to overcome the mechanical connection that holds the two devices together. At step 708, the snake-arm robot 102 is removed from the engine while leaving the servicing device in place within the engine.

Figure 8:
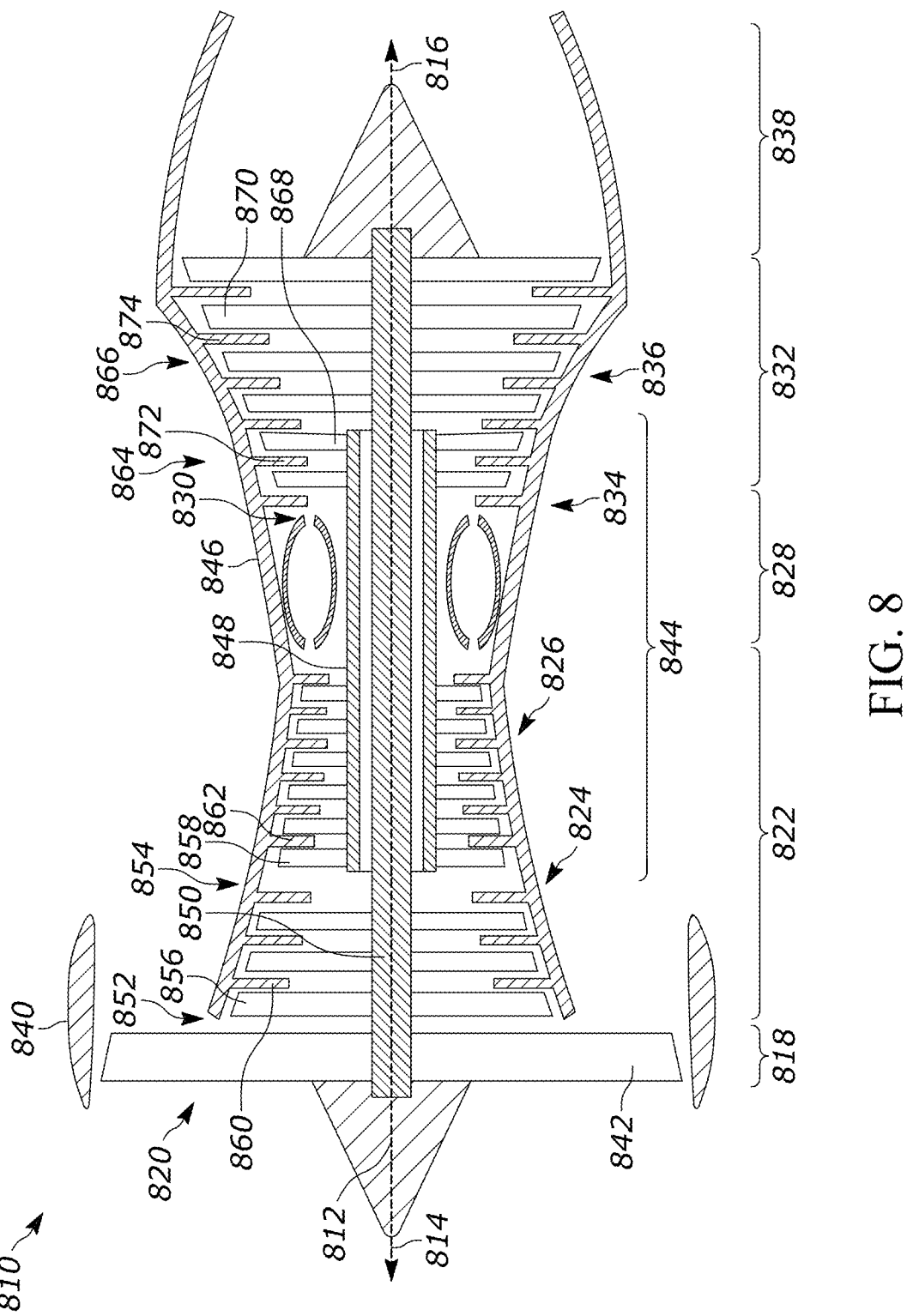
FIG. 8 comprises a diagram of an engine as configured in accordance with various embodiments of these teachings.

Referring now to FIG. 8, a schematic cross-sectional diagram of a conventional gas turbine engine 810 for an aircraft in which an imaging and inspection system described herein can operate is described. The gas turbine engine 810 has a generally longitudinally extending axis or centerline 812 extending forward 814 to aft 816. The gas turbine engine 810 includes, in downstream serial flow relationship, a fan section 818 including a fan 820, a compressor section 822 including a booster or low pressure (LP) compressor 824 and a high pressure (HP) compressor 826, a combustion section 828 including a combustor 830, a turbine section 832 including a HP turbine 834 and a LP turbine 836, and an exhaust section 838.

The fan section 818 includes a fan casing 840 surrounding the fan 820. The fan 820 includes a plurality of fan blades 842 disposed radially about the centerline 812.

The HP compressor 826, the combustor 830, and the HP turbine 834 form a core 844 of the gas turbine engine 810 which generates combustion gases. The core 844 is surrounded by core casing 846 which can be coupled with the fan casing 840.

An HP shaft or spool 848 disposed coaxially about the centerline 812 of the gas turbine engine 810 drivingly connects the HP turbine 834 to the HP compressor 826. An LP shaft or spool 850, which is disposed coaxially about the centerline 812 of the gas turbine engine 810 within the larger diameter annular HP spool 848, drivingly connects the LP turbine 836 to the LP compressor 824 and fan 820.

The LP compressor 824 and the HP compressor 826 respectively include a plurality of compressor stages 852, 854, in which a set of compressor blades 856, 858 rotate relative to a corresponding set of static compressor vanes 860, 862 (also called a nozzle) to compress or pressurize the stream of fluid passing through the stage. In a single compressor stage 852, 854, multiple compressor blades 856, 858 can be provided in a ring and extend radially outwardly relative to the centerline 812, from a blade platform to a blade tip, while the corresponding static compressor vanes 860, 862 are positioned downstream of and adjacent to the rotating blades 856, 858. It is noted that the number of blades, vanes, and compressor stages shown in FIG. 8 were selected for illustrative purposes only, and that other numbers are possible.

The HP turbine 834 and the LP turbine 836 respectively include a plurality of turbine stages 864, 866, in which a set of turbine blades 868, 870 are rotated relative to a corresponding set of static turbine vanes 872, 874 (also called a nozzle) to extract energy from the stream of fluid passing through the stage. In a single turbine stage 864, 866, multiple turbine blades 868, 870 can be provided in a ring and extend radially outwardly relative to the centerline 812, from a blade platform to a blade tip, while the corresponding static turbine vanes 872, 874 are positioned upstream of and adjacent to the rotating blades 868, 870. It is noted that the number of blades, vanes, and turbine stages shown in FIG. 8 were selected for illustrative purposes only, and that other numbers are possible.

In operation, the rotating fan 820 supplies ambient air to the LP compressor 824, which then supplies pressurized ambient air to the HP compressor 826, which further pressurizes the ambient air. The pressurized air from the HP compressor 826 is mixed with fuel in the combustor 830 and ignited, thereby generating combustion gases. Some work is extracted from these gases by the HP turbine 834, which drives the HP compressor 826. The combustion gases are discharged into the LP turbine 836, which extracts additional work to drive the LP compressor 824, and the exhaust gas is ultimately discharged from the gas turbine engine 810 via the exhaust section 838. The driving of the LP turbine 836 drives the LP spool 850 to rotate the fan 820 and the LP compressor 824.

It will be appreciated that although not depicted in FIG. 8, the gas turbine engine 810 may further define a plurality of openings allowing for inspection of various components within the gas turbine engine 810. For example, the gas turbine engine 810 may define a plurality of insertion tool openings at various axial positions within the compressor section, the combustion section 828, and/or the turbine section 832. Additionally, as will be discussed below, the gas turbine engine 810 may include one or more igniter ports within, e.g., the combustion section 828 of the gas turbine engine 810, that may allow for inspection of the combustion section 828.

Through these openings, the snake-arm robot 102 can be inserted along with the servicing device 104 (and potentially the engine servicing apparatus 115) as has been described elsewhere herein. For example, one of these openings may be in the vicinity of and allow access to the turbine section 832. The snake-arm robot 102 and servicing device 104 may be placed in the vicinity of the turbine blades 868, 870. The shape of the servicing device 104 may be locked, or the servicing device or servicing apparatus may be attached to a part of the engine, and the snake-arm robot 102 removed from the engine 110 as described herein. Then, various operations may be performed with the servicing device 104 or devices (e.g., the engine servicing apparatus 115) that are applied through the servicing device 104. It will also be appreciated that these approaches may be performed at any location in the gas turbine engine 810 where the openings are available such as in the combustion section 828.

It should further be appreciated that the exemplary gas turbine engine 810 depicted in FIG. 8 is by way of example only, and that in other exemplary embodiments, the gas turbine engine 810 may have any other suitable configuration, including, for example, any other suitable number of shafts or spools, turbines, compressors, etc. Additionally, or alternatively, in other exemplary embodiments, any other suitable turbine engine may be inspected with the approaches described herein. For example, in other exemplary embodiments, the engine may not be a turbofan engine, and instead may be configured as a turboshaft engine, a turboprop engine, turbojet engine, etc., or may be an industrial gas turbine engine for electricity generation, fluid pumping etc.

Further aspects of the invention are provided by the subject matter of the following clauses:

A method, the method comprising: mechanically coupling a snake-arm robot and a servicing device, the snake-arm robot having a distal end and a proximal end, the proximal end being coupled to an actuator, the mechanical coupling being accomplished by a longitudinal insertion of the snake-arm robot into the servicing device or the servicing device into the snake-arm robot; actuating the actuator to produce a movement of the snake-arm robot through a passage within an engine until the distal end of the snake-arm robot reaches a desired location, the movement of the snake-arm robot being effective to concurrently move the servicing device through the passage, the movement occurring until a desired position of the servicing device is obtained at the desired location; subsequent to reaching the desired location and position, decoupling the snake-arm robot from the servicing device; and removing the snake-arm robot from the engine while leaving the servicing device in place within the engine.

The method of any of the preceding clauses, wherein the servicing device comprises a rigidizable guide tube (RGT) that assumes a single predetermined shape, a RGT that assumes any of a plurality of arbitrary shapes, a borescope, or a flexible guide tube.

The method of any of the preceding clauses, wherein the servicing device comprises a rigidizable guide tube (RGT) and wherein the RGT is locked into a shape at the desired location.

The method of any of the preceding clauses, further comprising carrying an engine service apparatus by the servicing device to the desired location and releasing an engine servicing apparatus at the desired location.

The method of any of the preceding clauses, wherein the servicing device is a non-rigid or flexible device and wherein the servicing device or an engine servicing apparatus attaches to the engine or an engine component at the desired location.

The method of any of the preceding clauses, wherein positioning of the distal end of the snake-arm robot is adjusted based upon feedback received from sensors.

The method of any of the preceding clauses, wherein the snake-arm robot is inserted within the servicing device.

The method of any of the preceding clauses, wherein the servicing device is inserted within the snake-arm robot.

The method of any of the preceding clauses, further comprising inserting the snake-arm robot and the servicing device through an inspection port in the engine.

The method of any of the preceding clauses, wherein the snake-arm robot and the servicing device are automatically guided to the desired location via a controller.

A system, the system comprising: a snake-arm robot, the snake-arm robot having a distal end and a proximal end, the proximal end being coupled to an actuator; and a servicing device, the servicing device being mechanically coupled to the snake-arm robot, the mechanical coupling being accomplished by a longitudinal insertion of the snake-arm robot into the servicing device or the servicing device into the snake-arm robot; wherein actuation of the actuator is effective to produce a movement of the snake-arm robot through a passage of an engine until the distal end of the snake-arm robot reaches a desired location, the movement of the snake-arm robot being effective to concurrently move the servicing device through the passage to a desired position at the desired location; wherein the snake-arm robot is subsequently de-coupled from the servicing device and removed from the engine while leaving the servicing device in place within the engine.

The system of any of the preceding clauses, wherein the servicing device comprises a rigidizable guide tube (RGT) that assumes a single predetermined shape, a RGT that assumes any of a plurality of arbitrary shapes, a borescope, or a flexible guide tube.

The system of any of the preceding clauses, wherein the servicing device comprises a rigidizable guide tube (RGT) and wherein the servicing device is locked in shape at the desired location.

The system of any of the preceding clauses, further comprising an engine servicing apparatus that is released at the desired location.

The system of any of the preceding clauses, wherein the servicing device is a non-rigid or flexible device and wherein the servicing device or an engine servicing apparatus are configured to attach to the engine or an engine component at the desired location.

The system of any of the preceding clauses, further comprising sensors and wherein the distal end of the snake-arm robot is adjusted based upon feedback received from the sensors.

The system of any of the preceding clauses, wherein the snake-arm robot is inserted within the servicing device.

The system of any of the preceding clauses, wherein the servicing device is inserted within the snake-arm robot.

The system of any of the preceding clauses, wherein the snake-arm robot and the servicing device are configured to be inserted through an inspection port in the engine.

The system of any of the preceding clauses, further comprising a controller that is configured to automatically guide the snake-arm robot and the servicing device to the desired location.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

The invention claimed is:

1. A system, the system comprising:
a snake-arm robot, the snake-arm robot having a distal end and a proximal end, the proximal end being coupled to an actuator;
a servicing device, the servicing device being mechanically coupled to the snake-arm robot via a mechanical coupling, the mechanical coupling being accomplished by a longitudinal insertion of the snake-arm robot into the servicing device; and
a controller configured to execute electronic instructions to:
operate the actuator to produce a movement of the snake-arm robot through a passage of an engine until the distal end of the snake-arm robot reaches a desired location, the movement of the snake-arm robot being effective to concurrently move the servicing device through the passage to a desired position at the desired location;
operate the actuator to decouple the snake-arm robot from the servicing device; and
operate the actuator to remove the snake-arm robot from the engine while leaving the servicing device in place within the engine.

2. The system of claim 1, wherein the servicing device comprises a rigidizable guide tube (RGT) that assumes a single predetermined shape, a RGT that assumes any of a plurality of arbitrary shapes, a borescope, or a flexible guide tube.

3. The system of claim 1, further comprising an engine servicing apparatus that is configured to be released at the desired location.

4. The system of claim 3, wherein the engine servicing apparatus is configured to be attached to a blade of the engine so as to be transported within the engine upon rotation of an engine rotor, the engine servicing apparatus including components that provide inspection operations, servicing operations, or maintenance operations in the engine.

5. The system of claim 3, wherein the engine servicing apparatus is configured to provide a drilling operation, a sawing operation, an ablation operation, a sanding operation, a sensing operation, or a grinding operation.

6. The system of claim 1, further comprising sensors and wherein the distal end of the snake-arm robot is configured to be adjusted based upon feedback received from the sensors.

7. The system of claim 1, wherein the snake-arm robot and the servicing device are configured to be inserted through an inspection port in the engine.

8. The system of claim 1, further comprising a controller that is configured to automatically guide the snake-arm robot and the servicing device to the desired location.

9. The system of claim 1, wherein the actuator comprises a motor.

10. The system of claim 1, wherein the snake-arm robot is configured to be operated to provide a wave-like motion.

11. The system of claim 1, further comprising a user interface that is configured to control movement of the snake-arm robot.

12. The system of claim 11, wherein the user interface comprises a joy stick.

13. The system of claim 1, wherein the engine is a gas turbine engine.

14. The system of claim 1, wherein the actuator is configured to receive a command, the command including the desired location.

15. The system of claim 11, wherein the user interface is configured to accept commands from an operator.

16. The system of claim 12, wherein the joy stick is configured to be utilized by a user to steer the snake-arm robot during an exploratory operation.

* * * * *